Dec. 6, 1949 — E. E. KUBEC — 2,490,638
BENT GLASS OR PLASTIC PICTURE FRAME
Filed Dec. 9, 1944
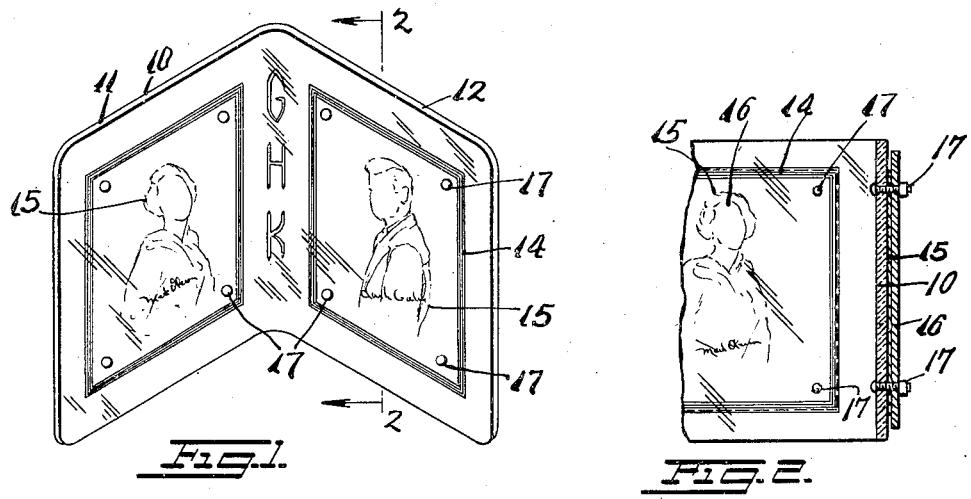
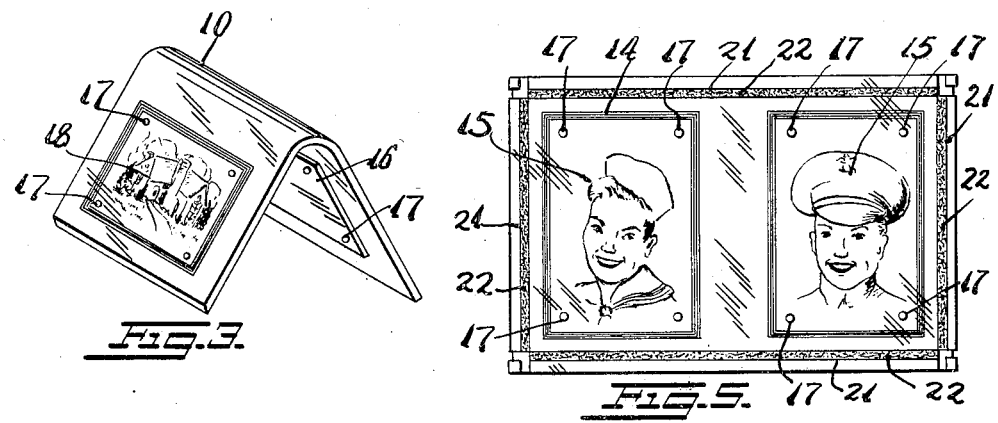
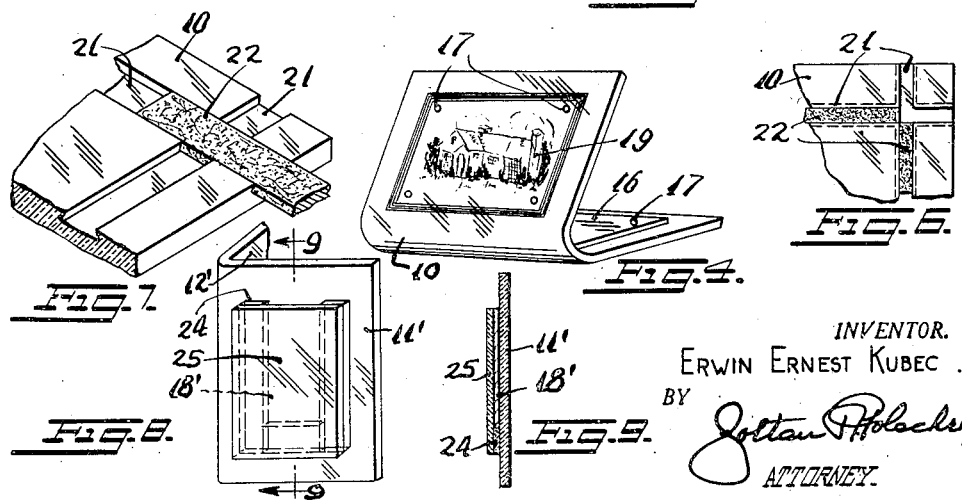
INVENTOR.
ERWIN ERNEST KUBEC Patented Dec. 6, 1949

2,490,638

UNITED STATES PATENT OFFICE 2,490,638

BENT GLASS OR PLASTIC PICTURE FRAME

Erwin Ernest Kubec, Flushing, N. Y.

Application December 9, 1944, Serial No. 567,349

1 Claim. (Cl. 40—154)

This invention relates to new and useful improvements in a bent glass or plastic picture frame.

More specifically, the invention proposes an improved picture frame which comprises merely a rectangularly shaped sheet of thermo-plastic (or glass) material bent centrally along a transverse area forming a V-shape and having openings in the arms of said V-shape for framing pictures, and other objects, and which may also be provided with monograms, initials and the like.

The invention proposes a simple arrangement upon the back of said thermo-plastic sheet for holding the pictures, or other objects over said openings.

An important feature of the invention resides in the fact that the bent thermo-plastic sheet material may be rested on a flat surface in various positions, depending merely on taste, but for the several positions, it is necessary that the pictures be turned in different directions to be right side up. The frame may be rested upon one side, or upon the ends of the V-shape, or upon one of the arms of the V-shape.

The invention also proposes that the edge portions of the frame be decorated with, for example molding, or scalloping material of different designs, mirroring, or the like.

Still further the invention contemplates the construction of a bent glass, or plastic picture frame as described, which is simple, attractive and which may be manufactured and sold at a reasonable cost:

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a perspective view of a bent glass, or plastic picture frame constructed in accordance with this invention and shown rested upon one side.

Fig. 2 is a fragmentary vertical sectional view taken on the line 2—2 of Fig. 1.

Fig. 3 is a perspective view of another bent glass, or plastic picture frame constructed in accordance with this invention, but illustrated as used by resting it upon the ends of the V-shape arms.

Fig. 4 is another perspective view of a bent glass, or plastic picture frame, embodying this invention, but rested at one of the side arms.

Fig. 5 is a front elevational view of still another bent glass, or plastic picture frame embodying the same invention, but of a modified form.

Fig. 6 is a fragmentary enlarged detailed view of one of the upper corners of Fig. 5.

Fig. 7 is a fragmentary enlarged perspective view of the corner shown in Fig. 6, but with the molding shifted to another position.

Fig. 8 is a perspective rear view of a bent transparent picture frame constructed according to a further modified form of the invention.

Fig. 9 is a fragmentary sectional view taken on line 9—9 of Fig. 8.

The bent glass, or plastic picture frame in accordance with that form of the invention illustrated in Figs. 1 and 2 inclusive, includes a rectangularly shaped sheet 10 of thermoplastic (or glass) material bent centrally along a transverse area forming a V-shape having arms 11 and 12. The arms 11 and 12 are used to display pictures 15, or other objects.

The back face of the sheet 10 is provided with means for holding the pictures 15 which are framed with borders 14. This means comprises plates 16 disposed across the backs of the pictures or other objects 15, and releasably held in position by a group of fastening elements, or screws 17. The sheet 10 may be ornamented with surface ornamentation, or other ornaments. As seen in Fig. 2, the picture 15 is positioned intermediate each arm 11 and 12 and their respective plates 16. Initials and monograms may also be used.

In Fig. 3 another use of the picture frame is illustrated. The picture frame is shown displaying pictures 18 which are placed right side up in relation to the ends of the arms of the V-shape. This picture frame is used by resting it on the bottom ends of the V-shaped arms thereof.

In Fig. 4 still another use of the picture frame is disclosed in which the picture 19 is framed so that it is right side up in relation to the center bend of the sheet 10. This picture frame is placed upon one of its arms, of the V-shape, so that only the one picture 19 is being displayed.

In Figs. 5 to 7 inclusive, a modified form of the invention has been disclosed which is very similar to the prior form of the invention, distinguishing in the fact that grooves 21 are formed along the edges of the sheet 10 and releasably hold molding or other strips of material 22. The grooves 21 cross each other at the corners of the sheet 10 so that each groove communicates with an edge of the sheet 10 permitting the molding 22, or other strip member to be slipped into position. Of course, it is necessary that the molding 22 be flexible, or bendable so as to assume the V-shape when engaged along the sides of the picture frame.

It must be clear that other designs of decorative strips may be used in place of the strips 22. The strips 22 and the grooves 21 are shown to be dove-tailed in cross section. This serves to firmly hold the strips in position in the grooves.

In other respects this form of the invention is identical to the prior form and identical parts are indicated by the same reference numerals.

In Figs. 8 and 9, a plastic or similar support is shown at the back of arms 11' and 12', consisting of a U-shaped spacing rib 24, having a backing plate 25. The picture 18' is placed between the backing plate 25 and the arm 11' or 12', between the space formed by the U-shaped rib 24. The parts 24 and 25 may also be made of a thermo-plastic or glass material.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

A picture frame comprising a rectangularly shaped sheet of stiff material bent centrally along a transverse area forming a V-shape, a plate secured to one side of each arm of said V-shaped sheet, display material mounted between each arm and its respective plate, means releasably securing said display material and each of said plates on their respective said arms, said sheet having grooves formed therein adjacent the edges thereof, and decorative flexible material disposed within said grooves.

ERWIN ERNEST KUBEC.

REFERENCES CITED

The following references are of record in the file of this patent:

UNITED STATES PATENTS

| Number | Name | Date |
| --- | --- | --- |
| 140,722 | Muldaur | July 8, 1873 |
| 337,033 | Thonssen | Mar. 2, 1886 |
| 862,699 | Bierlein et al. | Aug. 6, 1907 |
| 1,225,195 | Wanda | May 8, 1917 |
| 1,778,636 | Herbert | Oct. 14, 1930 |
| 1,809,786 | LeJeune | June 9, 1931 |
| 2,069,894 | Mattman | Feb. 9, 1937 |
| 2,196,105 | Cunningham | Apr. 2, 1940 |
| 2,223,674 | Cohen | Dec. 3, 1940 |